(12) United States Patent
Roy et al.

(10) Patent No.: US 8,870,219 B1
(45) Date of Patent: Oct. 28, 2014

(54) FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

(71) Applicant: Faurecia Interior Systems, Inc., Auburn Hills, MI (US)

(72) Inventors: Wes Roy, Oakland, MI (US); James Steele, Macomb, MI (US); Raymond E. Kalisz, Livonia, MI (US); Scott Beam, Commerce Twp., MI (US); Adrien Bender, Clawson, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/108,915

(22) Filed: Dec. 17, 2013

Related U.S. Application Data

(60) Provisional application No. 61/861,494, filed on Aug. 2, 2013.

(51) Int. Cl.
*B60R 21/20* (2011.01)
*B60R 21/215* (2011.01)

(52) U.S. Cl.
CPC .................................. *B60R 21/215* (2013.01)
USPC ..................... 280/728.3; 280/728.2; 280/732

(58) Field of Classification Search
USPC .......................... 280/728.1, 728.2, 728.3, 732
See application file for complete search history.

(56) References Cited

U.S. PATENT DOCUMENTS

| | | | |
|---|---|---|---|
| 5,135,252 A | 8/1992 | Suran et al. |
| 5,145,207 A | 9/1992 | Bederka et al. |
| 5,303,951 A | 4/1994 | Goestenkors et al. |
| 5,342,090 A | 8/1994 | Sobczak et al. |
| 5,482,313 A | 1/1996 | Ikeya et al. |
| 5,527,063 A | 6/1996 | Garner et al. |
| 5,588,669 A | 12/1996 | Leonard et al. |
| 5,611,564 A | 3/1997 | Bauer |

(Continued)

FOREIGN PATENT DOCUMENTS

| | | |
|---|---|---|
| DE | 102006008564 A1 | 8/2007 |
| DE | 102007007822 A1 | 9/2007 |

(Continued)

OTHER PUBLICATIONS

USPTO, Notice of Allowance and Fee(s) Due for U.S. Appl. No. 14/108,895, mailed Aug. 8, 2014.

*Primary Examiner* — Toan To
(74) *Attorney, Agent, or Firm* — Ingrassia Fisher & Lorenz, PC

(57) ABSTRACT

Interior panels having integrated airbag doors for motor vehicles are provided. In one example, an interior panel comprises a substrate having an opening. A skin covering and foam cover the substrate. An airbag chute-door assembly is mounted to the substrate and has a front side that faces towards the skin covering and the foam. The airbag chute-door assembly comprises a chute wall that extends from a side opposite the front side. A door flap portion is pivotally connected to the chute wall via a hinge section and at least partially covers the opening. A perimeter flange extends from the chute wall and overlies the substrate. The airbag chute-door assembly has a groove formed in the front side between the door flap portion and the perimeter flange defining a frangible tear seam.

13 Claims, 3 Drawing Sheets

(56) References Cited

U.S. PATENT DOCUMENTS

| | | | |
|---|---|---|---|
| 5,704,635 A | 1/1998 | Tajiri et al. | |
| 5,851,023 A | 12/1998 | Nagata et al. | |
| 5,887,891 A | 3/1999 | Taquchi et al. | |
| 5,961,142 A | 10/1999 | Shiraki et al. | |
| 6,152,480 A | 11/2000 | Iwanaga | |
| 6,161,862 A | 12/2000 | Rose et al. | |
| 6,161,865 A | 12/2000 | Rose et al. | |
| 6,193,271 B1 | 2/2001 | Shimane | |
| 6,250,669 B1 | 6/2001 | Ohmiya | |
| 6,406,056 B2 | 6/2002 | Yokota | |
| 6,457,739 B1 | 10/2002 | Dailey et al. | |
| 6,457,744 B1 | 10/2002 | Tonooka | |
| 6,460,874 B1 | 10/2002 | McDonnell et al. | |
| 6,543,802 B1 | 4/2003 | Uchiyama et al. | |
| 6,557,886 B1 | 5/2003 | Sakaguchi | |
| 6,716,519 B2 | 4/2004 | Ueno et al. | |
| 6,726,239 B1* | 4/2004 | Teranishi et al. | 280/728.3 |
| 7,063,349 B2 | 6/2006 | Takahashi | 280/728.2 |
| 7,237,797 B2* | 7/2007 | Dailey et al. | 280/728.3 |
| 7,434,828 B2 | 10/2008 | Okamoto et al. | |
| 7,543,845 B2 | 6/2009 | Dailey et al. | |
| 7,607,681 B2 | 10/2009 | Okada et al. | |
| 7,690,677 B2* | 4/2010 | Cowelchuk et al. | 280/728.3 |
| 7,695,001 B2 | 4/2010 | Adler et al. | |
| 7,766,372 B2 | 8/2010 | Hillman | |
| 7,914,039 B2* | 3/2011 | Mazzocchi et al. | 280/732 |
| 7,992,890 B2 | 8/2011 | Nogaret et al. | |
| 8,336,906 B2* | 12/2012 | Kim et al. | 280/728.3 |
| 8,336,908 B1 | 12/2012 | Kalisz et al. | |
| 8,469,393 B1* | 6/2013 | Siewert et al. | 280/728.3 |
| 8,474,861 B1* | 7/2013 | Twork | 280/728.3 |
| 2001/0026063 A1 | 10/2001 | Yokota | |
| 2002/0042235 A1 | 4/2002 | Ueno et al. | |
| 2002/0063415 A1 | 5/2002 | Uchiyama et al. | |
| 2003/0189321 A1* | 10/2003 | Takahashi | 280/728.3 |
| 2003/0234521 A1 | 12/2003 | Schenck et al. | |
| 2004/0126532 A1* | 7/2004 | Gardner, Jr. | 428/43 |
| 2004/0145164 A1 | 7/2004 | North | |
| 2004/0174000 A1* | 9/2004 | Speelman et al. | 280/728.3 |
| 2005/0167958 A1 | 8/2005 | Okada et al. | |
| 2005/0225062 A1 | 10/2005 | Dumbrique | |
| 2006/0214339 A1 | 9/2006 | Miyake | |
| 2007/0045995 A1 | 3/2007 | Adler et al. | |
| 2007/0205585 A1 | 9/2007 | Okada et al. | |
| 2008/0018081 A1 | 1/2008 | Yang et al. | |
| 2008/0128943 A1 | 6/2008 | Hager | |
| 2009/0309338 A1 | 12/2009 | Hillman | |
| 2010/0230938 A1 | 9/2010 | Mazzocchi et al. | |
| 2010/0230939 A1 | 9/2010 | Mazzocchi et al. | |
| 2011/0062685 A1 | 3/2011 | Kim et al. | |
| 2011/0248482 A1 | 10/2011 | Kim | |
| 2012/0007346 A1 | 1/2012 | Morawietz et al. | |
| 2012/0217729 A1 | 8/2012 | Horibe et al. | |

FOREIGN PATENT DOCUMENTS

| | | |
|---|---|---|
| DE | 102008011697 A1 | 9/2009 |
| DE | 102008021157 A1 | 10/2009 |
| DE | 102009024193 A1 | 5/2010 |
| DE | 102011001981 A1 | 5/2012 |
| DE | 102012212985 A1 | 2/2013 |
| JP | H0330641 U | 3/1991 |
| JP | H11151728 A | 6/1999 |
| JP | H11321513 A | 11/1999 |
| JP | 2004243594 A | 9/2004 |
| JP | 2005008057 A | 1/2005 |
| JP | 2007145211 A | 6/2007 |
| JP | 2008126972 A | 6/2008 |
| JP | 2008149810 A | 7/2008 |
| WO | 02055346 A1 | 7/2002 |
| WO | 2005023589 A2 | 3/2005 |

* cited by examiner

FOAM-IN-PLACE INTERIOR PANELS HAVING INTEGRATED AIRBAG DOORS INCLUDING SUBSTRATES WITH AIRBAG CHUTE-DOOR ASSEMBLIES FOR MOTOR VEHICLES

CROSS-REFERENCE TO RELATED APPLICATIONS

This application is related to and claims all available benefit of U.S. Provisional Patent Application 61/861,494 filed Aug. 2, 2013, the entire contents of which are herein incorporated by reference.

FIELD OF THE INVENTION

The technical field relates generally to interior panels structured for inflatable restraints for motor vehicles, and more particularly to foam-in-place interior panels having integrated airbag doors including substrates with airbag chute-door assemblies for motor vehicles.

BACKGROUND

Motor vehicles often include an inflatable restraint apparatus having an airbag device with a deployable airbag positioned in or behind an interior vehicle panel, such as an instrument panel, door panel, seats, and the like. Many interior panels include an integrated airbag door formed into the interior panel that is designed to break free upon deployment of the airbag. Often an area of the interior panel surrounding the integrated airbag door is scored or pre-weakened to form a seam that facilitates a clean airbag deployment e.g., airbag deployment with minimal or no fragmentation.

Foam-in-place (FIP) interior panels are often used to provide a padded finish to desired areas of the interiors of motor vehicles. FIP interior panels include a substrate and a skin covering with a foam layer formed between the skin covering and the substrate to provide padding for a softer finish. During fabrication, the foam layer is typically formed by injecting a foam forming material(s) between the substrate and the skin covering. In FIP interior panels that include an airbag device, an opening is typically defined in the substrate to accommodate the airbag device.

In one example, disclosed in U.S. Pat. No. 7,237,797 issued to Dailey et al., a modular airbag door assembly that includes a door panel and a separate airbag chute that are assembled together and mounted to a substrate of a FIP instrument panel. The modular airbag door assembly is positioned on a front side of the substrate with the door panel extending over an opening formed through the substrate and the airbag chute extending through the opening to the back side of the substrate. A pre-weakened skin covering with an underlying foam layer is then formed over the front side of the substrate so that the modular airbag door assembly is integrated into the FIP instrument panel hidden behind the pre-weakened skin covering and the foam layer. An airbag device is then mounted to both the chute portion and the substrate adjacent to the back side of the substrate. Unfortunately, this arrangement is relatively complex using multiple parts including a door panel and a separate airbag chute during assembly. Additionally, deploying the door panel through the pre-weakened skin covering and the foam layer can sometimes produce foam fragments that are projected from the FIP instrument panel during airbag deployment. Further improvements in minimizing or eliminating foam fragmentation during airbag deployment are needed.

Accordingly, it is desirable to provide FIP interior panels having integrated airbag doors with improvements for assembling including reducing the complexity and the number of corresponding parts. Additionally, it is desirable to provide FIP interior panels having integrated airbag doors that minimize or eliminate foam fragmentation during airbag deployment. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles are provided herein. In accordance with an exemplary embodiment, an interior panel having an integrated airbag door for a motor vehicle includes, but is not limited to, a substrate having an outer surface, an inner surface, and an opening extending therethrough. A skin covering that extends over the substrate. A foam is disposed between the skin covering and the substrate. An airbag chute-door assembly is mounted to the substrate and has a front side that faces towards the skin covering and the foam. The airbag chute-door assembly comprises a chute wall that extends from a side opposite the front side away from the skin covering and the foam. The chute wall at least partially surrounds an interior space. The chute wall is configured to direct passage of an airbag through the interior space towards the opening during deployment. A door flap portion is pivotally connected to the chute wall via a hinge section and at least partially covers the opening. A perimeter flange extends from the chute wall away from the interior space. The perimeter flange has a flange section overlying the outer surface of the substrate. The airbag chute-door assembly has a groove formed in the front side between the door flap portion and the perimeter flange defining a frangible tear seam that ruptures during airbag deployment to allow the door flap portion to pivot about the hinge section. A portion of the foam is disposed in the groove.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to FIP interior panels having integrated airbag doors for motor vehicles. The exemplary embodiments taught herein provide an interior panel having an integrated airbag door for a motor vehicle. The interior panel comprises a substrate that has an outer surface, an inner surface, and an opening extending therethrough. A skin covering extends over the substrate and a foam is disposed between the skin covering and the substrate.

An airbag chute-door assembly is mounted to the substrate and has a front side that faces towards the skin covering and the foam. The airbag chute-door assembly comprises a chute wall that extends from a side opposite the front side away from the skin covering and the foam. The chute wall at least partially surrounds an interior space. The chute wall is configured to direct passage of an airbag through the interior space towards the opening during deployment of the airbag. A door flap portion is pivotally connected to the chute wall via a hinge section and at least partially covers the opening. A perimeter flange extends from the chute wall away from the interior space. The perimeter flange has a flange section overlying the outer surface of the substrate. In an exemplary embodiment, advantageously, the airbag chute-door assembly is formed as a single integrated part, for example, via an injection molding process to minimize the number of parts and reduce complexity.

The airbag chute-door assembly has a groove formed in the front side between the door flap portion and the perimeter flange defining a frangible (e.g., fragile or breakable) tear seam. The frangible tear seam ruptures during airbag deployment to allow the door flap portion to pivot about the hinge section. A portion of the foam is disposed in the groove. In an exemplary embodiment, it has been found that during fabrication, specifically during formation of the foam layer, of the FIP interior panel, the presence of the groove causes imperfections in the portions of the foam that are disposed in the groove. Advantageously, these foam imperfections can act as stress risers (e.g., stress concentrators) during airbag deployment to facilitate foam tearing, thereby minimizing or eliminating foam fragmentation (e.g., clean form tearing), as the door flap portion pivots to an open position to allow passage of the airbag through the opening of the substrate.

Figure 1:
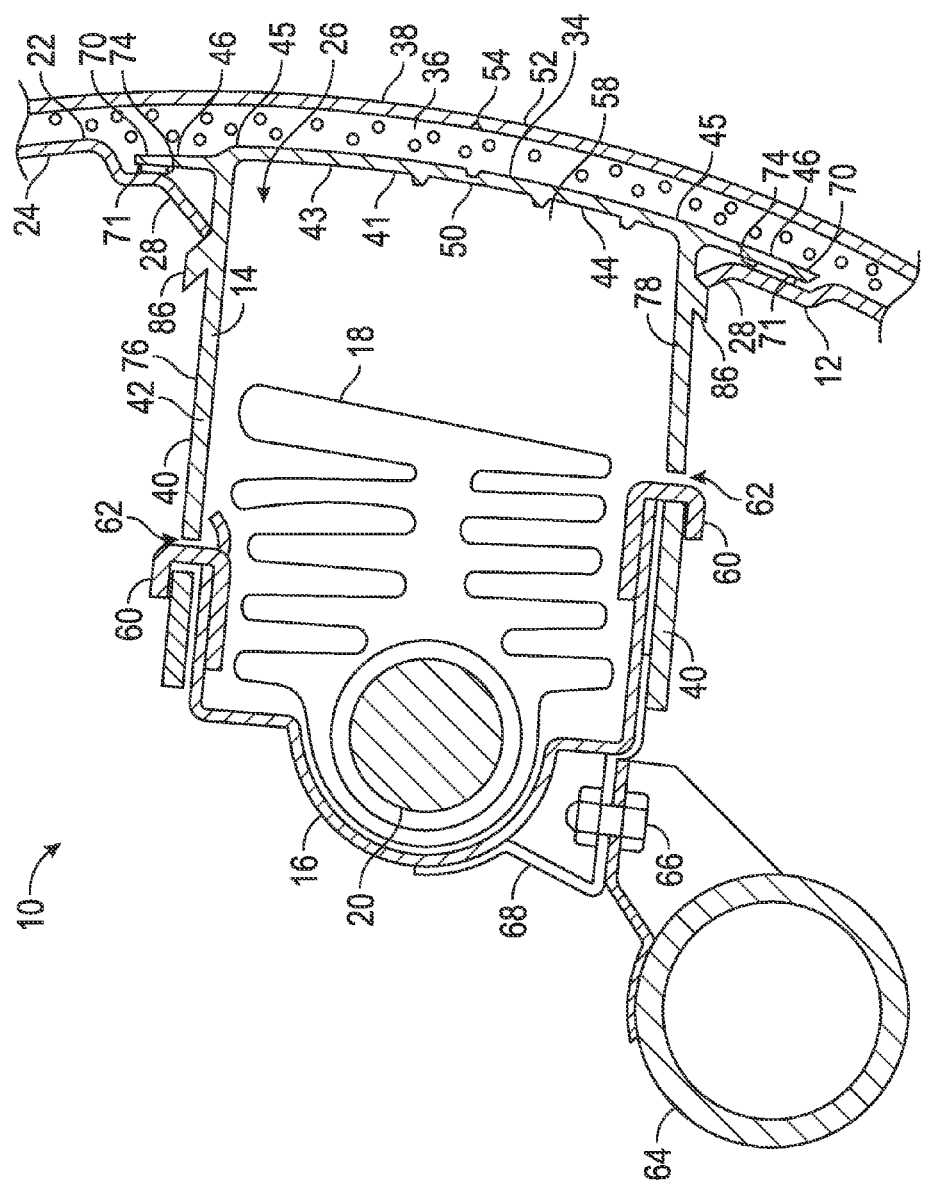
FIG. 1 is a sectional view of an airbag chute-door assembly in accordance with an exemplary embodiment.

FIG. 1 is a vertical sectional view of an interior panel 10 including a substrate 12 and an airbag chute-door assembly 14 for a motor vehicle in accordance with an exemplary embodiment. In an exemplary embodiment, the interior panel 10 is an instrument panel that can be positioned forward of a driver seat and a front passenger seat in an interior of the motor vehicle. As such, FIG. 1 depicts a view of the interior panel 10 forward of the front passenger seat. Alternatively, the interior panel 10 can be a door panel or other interior vehicle trim panel. As illustrated, the interior panel 10 comprises the substrate 12, the airbag chute-door assembly 14, and an airbag module 16 that contains a deployable airbag 18 and an inflator 20.

The substrate 12 has an outer surface 22 that faces towards the interior of the motor vehicle, an inner surface 24 that faces away from the interior of the motor vehicle, and an opening 26 that is formed through the substrate 12. As illustrated, the opening 26 is defined by inner perimeter edges 28 of the substrate 12 and is covered by the airbag chute-door assembly 14 that is mounted to the substrate 12. The substrate 12 may be formed of a plastic material, such as, for example, styrene maleic anhydride (SMA), polycarbonate (PC), ABS, PC/ABS, polypropylene (PP), or any other substrate material for vehicle interior applications known to those skilled in the art. The airbag chute-door assembly 14 may be formed of a polymeric material, such as TPE, TPO, or the like, for example as a single injection molded piece. The outer surface 22 of the substrate 12 and a front side 34 of the airbag chute-door assembly 14 are covered by foam 36 and a skin covering 38 to define the interior panel 10 as an FIP interior panel.

The airbag chute-door assembly 14 comprises a chute wall 40 that defines a chute portion 42 extending from a back side 41 of the airbag chute-door assembly 14, door flap portions 43 and 44 that are pivotally connected to the chute portion 42 via corresponding hinges sections 45, and a perimeter flange 46 that surrounds the chute portion 42. As illustrated and will be discussed in further detail below, the door flap portions 43 and 44 are coupled together by a frangible tear seam 50 to form an "H-pattern" door arrangement. Alternative door arrangements known to those skilled in the art may also be used, such as, for example a "U-pattern" door arrangement with only a single door flap portion. The door flap portions 43 and 44 and the overlying foam 36 and skin covering 38 together define an integrated airbag door 52 that opens in a parting manner along the frangible tear seam 50 to permit the airbag 18 to unfold and inflate outside of the interior panel 10. To facilitate the opening of the integrated airbag door 52, the skin covering 38 may be pre-weakened to define a seam 54 that tears during airbag deployment.

The chute wall 40 at least partially surrounds an interior space 58. The interior space 58 is sized to permit passage of the airbag 18 towards the door flap portions 43 and 44 and the integrated airbag door 52 during airbag deployment. Attached to the chute wall 40 is the airbag module 16 that accommodates the airbag 18 in the folded state. In an exemplary embodiment, the airbag module 16 has a plurality of hooks 60 that project outwardly through chute wall openings 62 to engage the chute wall 40. The airbag module 16 is attached to a cross member 64 by a bolt and nut 66 via a supporting member 68. As illustrated, the inner perimeter edges 28 of the substrate engage locking tabs 85 on the chute wall 40 for fixedly mounting the airbag chute-door assembly 14 to the substrate 12.

The perimeter flange 46 extends from the chute wall 40 away from the interior space 58 and has a flange section 70. The flange section 70 overlies the outer surface 22 of the substrate 12. In an exemplary embodiment, a foam gasket 71 is disposed between the flange section 70 and the outer surface 22 of the substrate to form a seal 74 substantially or completely around the opening 26. During an early fabrication stage for forming the foam 36, advantageously the seal 74 substantially prevents leakage of a liquid foam forming material into the interior space 58.

Figure 2:
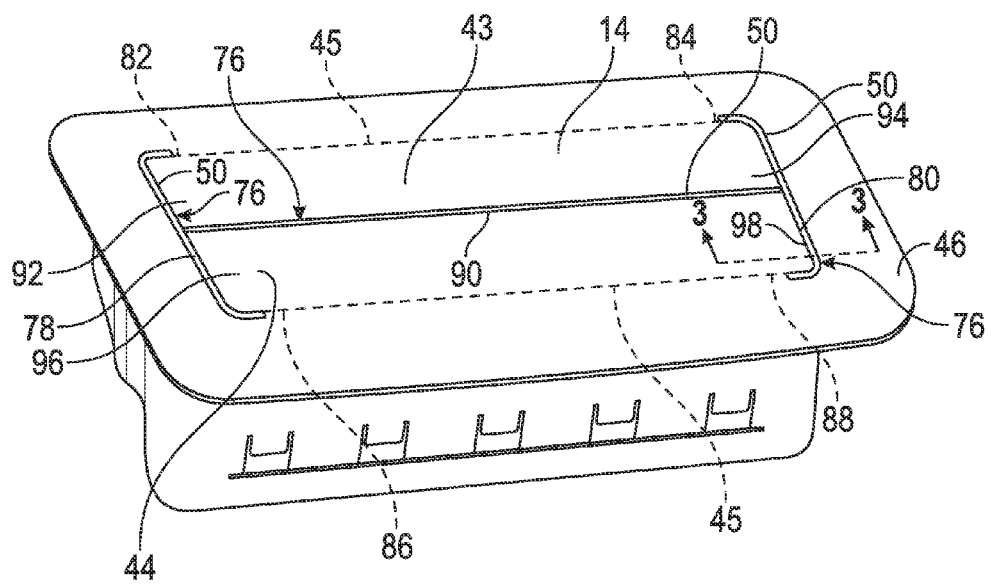
FIG. 2 is a perspective view of an airbag chute-door assembly in accordance with an exemplary embodiment.
Figure 3:
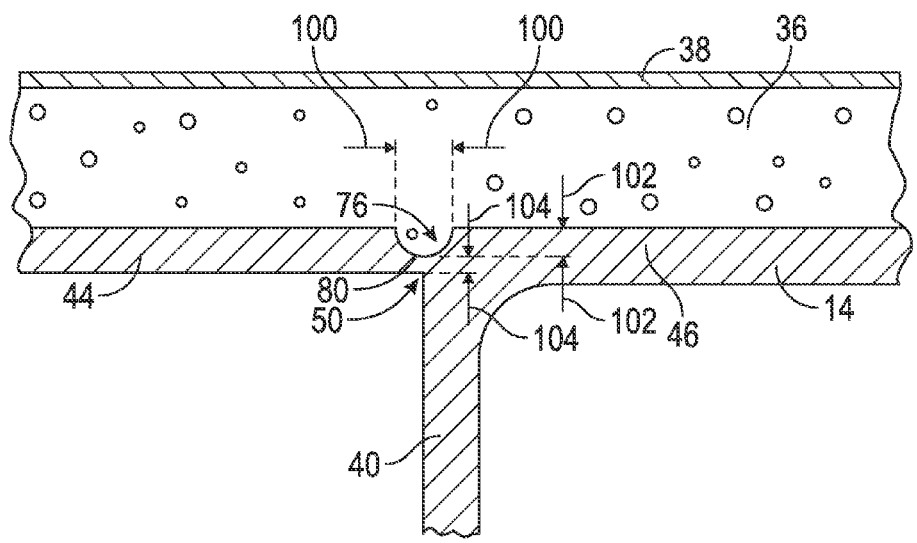
FIG. 3 is a sectional view taken along line 3-3 of the airbag chute-door assembly depicted in FIG. 2 and additionally including a skin covering and a foam.

FIG. 2 is a perspective view of the airbag chute-door assembly 14 in accordance with an exemplary embodiment. FIG. 3 is a sectional view taken along line 3-3 of the airbag chute-door assembly 14 depicted in FIG. 2 and additionally including the skin covering 38 and the foam 36. As illustrated, the airbag chute-door assembly 14 has a groove 76 that is formed in the front side 34 of the airbag chute-door assembly 14 defining the frangible tear seam 50. In an exemplary embodiment, the groove 76 is configured such that the frangible tear seam 50 has lateral tear seam sections 78 and 80 that each extends from an opposing end 82 or 84 of the hinge section 45 to a corresponding opposing end 86 or 88 of the other hinge section 45, and a transverse tear seam section 90 that extends between the lateral tear seam sections 78 and 80 to define an "H-pattern" airbag door arrangement. As illustrated, the lateral tear seam sections 78 and 80 are defined by portions of the groove 76 that are disposed between the perimeter flange 46 and the lateral sides 92, 94, 96, and 98 of the door flap portions 43 and 44.

In an exemplary embodiment, some of the foam 36 is disposed in the groove 76. As discussed above, it has been found that the portion of the foam 36 formed in the groove during formation of the foam 36 has imperfections that advantageously can act as stress risers during airbag deployment to facilitate tearing of the foam to minimize or eliminate foam fragmentation. In an exemplary embodiment, the groove 76 has a maximum width (indicated by arrows 100) of from about 2 to about 4 mm (e.g., radius of from about 1 to about 2 mm) and a depth (indicated by arrows 102) of about 1 to about 2 mm that advantageously facilitate localized formation of imperfections in the foam 36. In an exemplary embodiment, the frangible tear seam 50 has a thickness (indicated by arrows 104) of from about 0.25 to about 1.5 mm to facilitate rupturing of the frangible tear seam 50 to allow the door flap portions 43 and 44 to pivot about their respective hinge sections 45.

Figures 4, 5:
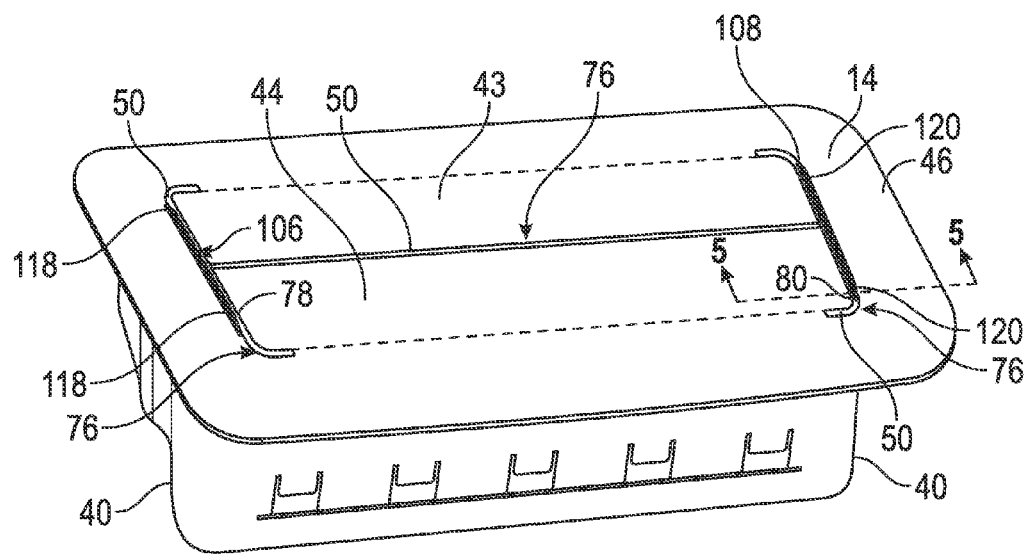
FIG. 4 is a perspective view of an airbag chute-door assembly in accordance with another exemplary embodiment.
FIG. 5 is a sectional view taken along line 5-5 of the airbag chute-door assembly depicted in FIG. 4 and additionally including a skin covering and a foam.

FIG. 4 is a perspective view of the airbag chute-door assembly 14 in accordance with an exemplary embodiment. FIG. 5 is a sectional view taken along line 5-5 of the airbag chute-door assembly 14 depicted in FIG. 4 and additionally including the skin covering 38 and the foam 36. The airbag chute-door assembly 14 as illustrated in FIG. 4 is similarly configured as the airbag chute-door assembly 14 shown in FIG. 2 including the groove 76 with its corresponding width 102 and depth 104 as discussed above but with the addition of upstanding ribs 106 and 108. In particular, the upstanding rib 106 and 108 are disposed on the front side 34 of the airbag chute-door assembly 14 adjacent to the lateral tear seam sections 78 and 80, respectively. In an exemplary embodiment, advantageously, it has been found that by positioning the upstanding ribs 106 and 108 adjacent to the lateral tear seam sections 78 and 80, clean tearing of the foam 36 during airbag deployment is enhanced with minimal or no foam fragmentation. In an exemplary embodiment, the upstanding ribs 106 and 108 each have a height (indicated by arrows 110) of from about 2 to about 4 mm and a width (indicated by arrows 112) of from about 1.5 to about 3.5 mm to facilitate initiating clean tearing of the foam 36. In an exemplary embodiment, the upstanding ribs 106 and 108 each have inboard sidewalls 114 that extend upwardly from an outboard sidewall 116 of the groove 76 to advantageously increase shear forces and tearing of the foam 36 along the inboard and outboard sidewalls 114 and 116 to minimize or eliminate foam fragmentation. In an exemplary embodiment, the upstanding ribs 106 and 108 each have tapered opposing end portions 118 and 120 to advantageously minimize read through of the upstanding ribs 106 and 108 on the surface of the skin covering 38.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
a substrate having an outer surface, an inner surface, and an opening extending therethrough;
a skin covering extending over the substrate;
a foam disposed between the skin covering and the substrate; and
an airbag chute-door assembly mounted to the substrate and having a front side that faces towards the skin covering and the foam, wherein the airbag chute-door assembly comprises:
a chute wall extending from a side opposite the front side away from the skin covering and the foam and at least partially surrounding an interior space, and wherein the chute wall is configured to direct passage of an airbag through the interior space towards the opening during deployment;
a door flap portion pivotally connected to the chute wall via a hinge section and at least partially covering the opening; and
a perimeter flange extending from the chute wall away from the interior space, wherein the perimeter flange has a flange section overlying the outer surface of the substrate, wherein the airbag chute-door assembly has a groove formed in the front side between the door flap portion and the perimeter flange defining a frangible tear seam that ruptures during airbag deployment to allow the door flap portion to pivot about the hinge section, and wherein a portion of the foam is disposed in the groove.

2. The interior panel of claim 1, wherein the frangible tear seam has a first lateral tear seam section and a second lateral tear seam section that are correspondingly disposed adjacent to opposing ends of the hinge section, and a transverse tear seam section that extends between the first and second lateral tear seam sections spaced apart from the hinge section, and wherein the portion of the foam is disposed in portions of the groove that define the first and second lateral tear seam sections.

3. The interior panel of claim 2, wherein the airbag chute-door assembly further comprises an additional door flap portion that is pivotally connected to the chute wall via an additional hinge section and at least partially covers the opening, wherein the transverse tear seam section is disposed between the door flap portion and the additional door flap portion spaced apart from the additional hinge section, and wherein the first and second lateral tear seam sections correspondingly extend adjacent to lateral sides of the door flap portion and the additional door flap portion to define an "H-pattern" airbag door arrangement.

4. The interior panel of claim 2, wherein the groove has a maximum width of from about 2 to about 4 mm.

5. The interior panel of claim 2, wherein the groove has a depth of about 1 to about 2 mm.

6. The interior panel of claim 2, wherein the groove has a radius of from about 1 to about 2 mm.

7. The interior panel of claim 2, wherein the frangible tear seam has a thickness of from about 0.25 to about 1.5 mm.

8. The interior panel of claim 2, wherein the airbag chute-door assembly has a first upstanding rib that is disposed on the front side adjacent to the first lateral tear seam section along the perimeter flange.

9. The interior panel of claim 8, wherein the airbag chute-door assembly has a second upstanding rib that is disposed on the front side adjacent to the second lateral tear seam section along the perimeter flange.

10. The interior panel of claim 8, wherein the first upstanding rib has a height of from about 2 to about 4 mm.

11. The interior panel of claim 8, wherein the first upstanding rib has a width of from about 1.5 to about 3.5 mm.

12. The interior panel of claim 8, wherein the first upstanding rib has an inboard sidewall that extends upwardly from an outboard sidewall of the groove.

13. The interior panel of claim 8, wherein the first upstanding rib has a tapered end portion.

\* \* \* \* \*